(12) United States Patent
Gillard et al.

(10) Patent No.: US 9,382,431 B2
(45) Date of Patent: Jul. 5, 2016

(54) COATING COMPOSITION

(75) Inventors: Michel Gillard, Louvain-la-Neuve (BE); Florence Cattiaux, Saint-Saulve (FR); Marcel Vos, IJmuiden (NL); Jos Prinsen, Bussum (NL)

(73) Assignee: PPG B.V., Uithoorn (NL)

( * ) Notice: Subject to any disclaimer, the term of this patent is extended or adjusted under 35 U.S.C. 154(b) by 214 days.

(21) Appl. No.: 13/642,763

(22) PCT Filed: Apr. 20, 2011

(86) PCT No.: PCT/EP2011/056327
§ 371 (c)(1),
(2), (4) Date: Dec. 21, 2012

(87) PCT Pub. No.: WO2011/131721
PCT Pub. Date: Oct. 27, 2011

(65) Prior Publication Data
US 2013/0090418 A1    Apr. 11, 2013

(30) Foreign Application Priority Data

Apr. 20, 2010   (EP) .................................... 10160482

(51) Int. Cl.
| C09D 5/16 | (2006.01) |
| C09D 7/12 | (2006.01) |
| C08L 31/02 | (2006.01) |
| C08K 3/22 | (2006.01) |

(52) U.S. Cl.
CPC ............ *C09D 5/1662* (2013.01); *C08L 31/02* (2013.01); *C09D 5/1668* (2013.01); *C09D 7/1216* (2013.01); *C08K 3/22* (2013.01)

(58) Field of Classification Search
CPC ............ C09D 5/16; C09D 7/12; C08L 31/02; C08K 3/22
USPC ................................................. 524/430, 272
See application file for complete search history.

(56) References Cited

U.S. PATENT DOCUMENTS

| 2004/0138332 A1 | 7/2004 | Aubart et al. |
| 2013/0102726 A1 | 4/2013 | Gillard et al. |

FOREIGN PATENT DOCUMENTS

| EP | 0 526 441 A1 | 7/1992 | |
| EP | 0 526 441 B1 | 5/1995 | |
| EP | 0 802 243 A2 | 4/1997 | |
| EP | 0 802 243 A2 | 10/1997 | |
| EP | 1 036 786 A1 | 3/1999 | |
| EP | 0 792 326 B1 | 2/2000 | |
| EP | 1 036 786 A1 | 9/2000 | |
| EP | 1 439 752 B1 | 10/2002 | |
| EP | 1 342 756 A1 | 6/2003 | |
| EP | 1342756 A1 * | 9/2003 | |
| EP | 1 978 065 A1 | 12/2006 | |
| EP | 1978065 A1 * | 10/2008 | |
| JP | H 10-30071 | 2/1998 | |
| JP | 2002-003776 | 1/2002 | |
| JP | EP 13442756 A1 * | 9/2003 | ........... C09D 5/1656 |
| JP | 2008-31404 | 2/2008 | |
| JP | EP 1078065 A1 * | 10/2008 | ............. C09D 5/165 |
| JP | 2010-084099 | 4/2010 | |
| NO | WO 2009007276 A1 * | 1/2009 | ................ C08F 2/38 |
| WO | WO 96/15198 | 5/1996 | |
| WO | WO 2008/106494 A1 | 9/2008 | |
| WO | WO 2009/007276 A1 | 1/2009 | |
| WO | WO 2009007276 A1 * | 1/2009 | |
| WO | WO 2009/149919 | 12/2009 | |

OTHER PUBLICATIONS

International Search Report dated Aug. 5, 2011 issued in connection with PCT/EP2011/056327.
Written Opinion of the International Searching Authority dated Aug. 5, 2011 in connection with PCT/EP2011/056373.
International Search Report and Written Opinion of Int'l Searching Authority (date mailed Aug. 3, 2011) issued in connection with PCT/EP2011/056327.
Written Opinion of the International Searching Authority dated Nov. 2, 2012 in connection with PCT/EP2011/056327.
International Preliminary Report on Patentability dated Nov. 1, 2012 in connection with PCT Application No. PCT/EP2011/056373.
Office Action issued Nov. 20, 2015 in connection with Japanese Patent Application 2013-505475.

* cited by examiner

*Primary Examiner* — Michael M Bernshteyn
(74) *Attorney, Agent, or Firm* — Goodwin Procter LLP

(57) ABSTRACT

A coating composition comprising: i) a carboxylic acid; comprising one or more of rosin or a hydrogenated derivative thereof; ii) at least one metal oxide compound; iii) a dehydrating agent; and iv) one or more binder; characterized in that, in the production of the coating composition, the dehydrating agent iii) is contacted with either of component i) or i) prior to the addition of the other component i) or ii).

12 Claims, 3 Drawing Sheets

Figure 1:
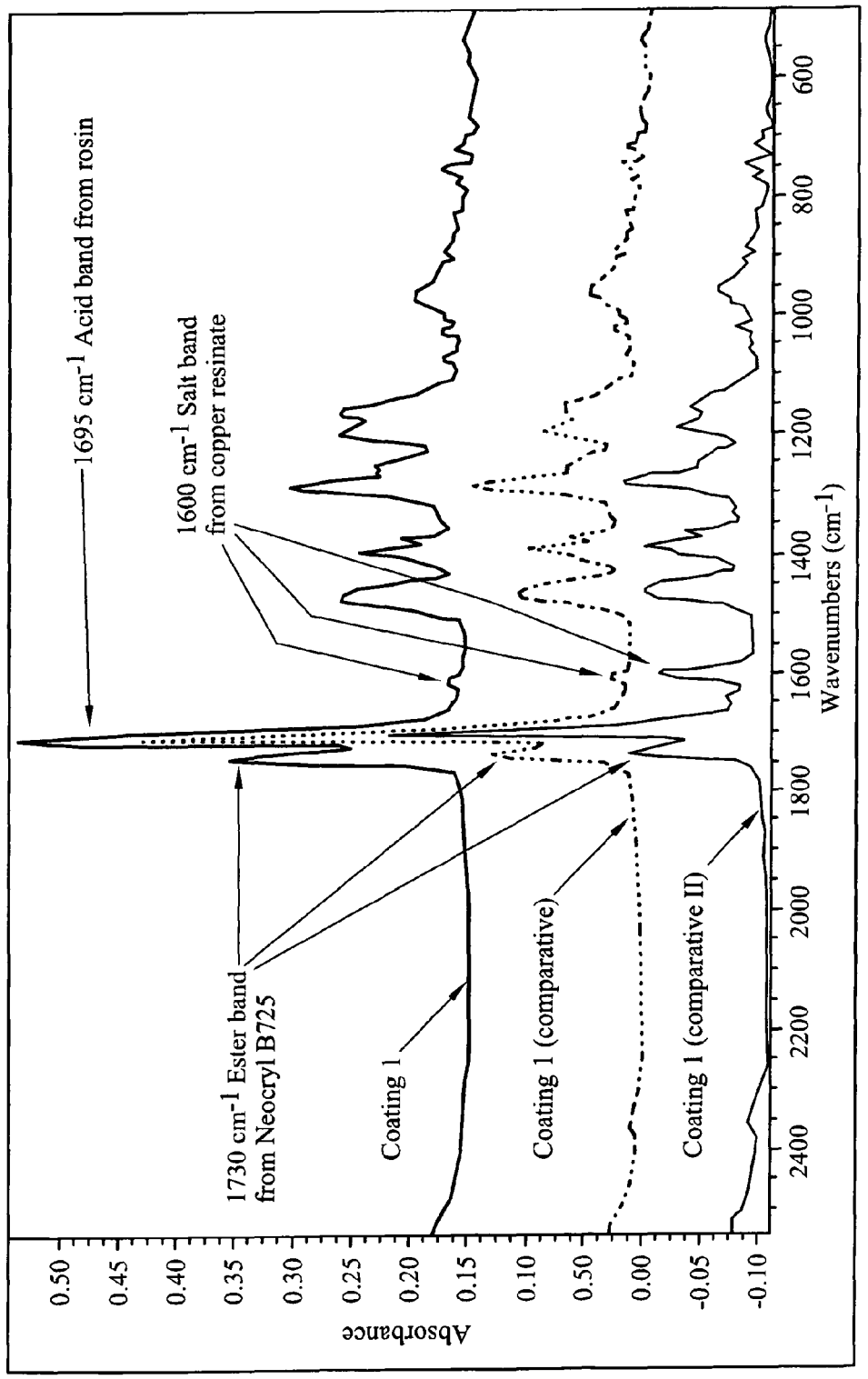

IR spectra of rosin blends with zinc oxide (direct or indirect) without A4 and direct zinc oxide with Sylosiv A4

COATING COMPOSITION

This is a national phase filing of International Application No. PCT/EP2011/056327, which was filed on Apr. 20, 2011 and published in English on Oct. 27, 2011 as WO 2011/131721, and claims priority of European Patent Application No. 10160482.5, filed on Apr. 20, 2010, the entire contents of which are incorporated herein by reference.

The present invention relates to a coating composition, particularly to a self polishing antifouling coating composition suitable for marine applications.

Coating compositions formulated to prevent the adhesion of micro-organisms, plants and animals to surfaces are well known in the art. An area where such coatings are of particular interest is in marine applications, where a surface is exposed to water which contains organisms that will adhere to the surface, thus fouling the surface. For example, if the surface is the hull of a ship, the increase in frictional resistance caused by the adhesion of organisms such as barnacles to the surface leads to a drastic reduction in the fuel efficiency of the ship.

Traditionally, there are two ways that a coating composition can be designed to prevent the adhesion and build up of fouling agents on a surface. Firstly, the coating can contain a biocide agent which serves to poison the organism attached to the surface, thus causing the organism to die and fall off the surface. This mode of adhesion prevention is often referred to as "antifouling" and such coatings often referred to as antifouling coatings.

Secondly, the coating may be designed to slowly degrade over time, thus organisms adhered to the surface will gradually fall off the surface with the degradation of the coating. The degradation is often caused by a slow hydrolysation of the coating (usually the binder within the coating). This mode of adhesion prevention is often referred to as "self polishing" and such coatings are often referred to as self polishing coatings.

In order to obtain an effective and efficient removal of organisms from surfaces it is now common practice to produce coating compositions that both contain a biocide and which slowly degrade over time. Such dual functional coatings are often referred to as self polishing antifouling coatings.

Rosin is a well known additive to self polishing antifouling coatings and consists primarily of abietic acid (a polycyclic partially dehydrated mono carboxylic acid). For example, EP 0,792,326 discloses the use of rosin in a self polishing anti fouling coating. However, this document discloses the use of fibres to improve mechanical properties of the coating, such as crack resistance, obtained from the composition.

It is also known to provide derivatives of rosin in self polishing antifouling paints. For example, EP 1,036,786 discloses the use of amine derivatives of rosin as antifouling agents.

Furthermore, it is known in the art that metal oxides react with carboxylic acids such as rosin to form metal carboxylates (in the case of rosin, metal rosinates, also known as metal resinates). A large number of self polishing antifouling coatings in the art that contain carboxylic acids such as rosin also contain metal oxides as fillers, pigments etc. Thus, when mixed, the carboxylic acid reacts with these components to form metal carboxylates. This is disclosed, for example, in EP 0,802,243 where zinc, copper, calcium and magnesium rosinates formed from rosin and metal compounds are discussed.

Alternatively or additionally it is known to add preformed metal carboxylate salts to self polishing antifouling coating compositions. For example, EP 0,526,441 discloses the preparation of copper resinate by reaction of rosin with copper hydroxycarbonate, prior to addition to a self polishing antifouling coating composition.

EP 1,342,756 (Chugoku) discloses a coating composition in which a metal (II) or metal (III) compound is added to a carboxylic acid in an excess of 1.2 equivalents or more to thereby form a carboxylic acid excess metal salt, prior to the addition to a silyl ester copolymeric binder. An exemplified carboxylic acid in this document is rosin and an exemplified metal (II) or metal (III) compound is zinc oxide, thus in the examples of this document, zinc resinate is formed prior to addition of the silyl ester copolymeric binder.

However, the coatings derived form the compositions proposed in the above documents suffer from one or more deficiencies. For example, the coatings often do not have a high enough hardness or have insufficient rates of self polishing. Furthermore, one big disadvantage with the above coatings is that the self polishing rates are difficult to accurately control, It is therefore an object of aspects of the present invention to provide an improved self polishing antifouling coating composition.

According to a first aspect of the present invention there is provided a coating composition comprising:
  i) a carboxylic acid, comprising one or more of rosin or a hydrogenated derivative thereof;
  ii) at least one metal oxide compound;
  iii) a dehydrating agent; and
  iv) one or more binder;
characterised in that, in the production of the coating composition, the dehydrating agent iii) is contacted with either of component i) or ii), prior to the addition of the other of component i) or ii).

Advantageously, it has been surprisingly found that the contacting of the dehydrating agent to either of component i) or ii), prior to the addition of the other of component i) or ii) during the production of the coating composition results in a coating composition having little or no metal resinate. Such a coating has been surprisingly found to display advantageous properties such as better self polishing rates, as compared to coatings where higher degree of metal resinates are formed. Furthermore, such a coating has been shown to have a faster and more constant erosion rate. This is beneficial for the performance and use in ships in (sub)tropical areas and on slower moving vessels and vessels with low operation rates <70%). Also, the present coating composition has higher volume solids than prior art coatings (typically about 70% instead of about 55%). This makes the coating composition more economic and more environmentally friendly (typically about 33% less solvent emission) in use.

While not wishing to be bound to any theory, it is believed that the reaction of the carboxylic acid and the metal oxide compound requires trace amounts of water as a catalyst to start the reaction. The reaction between the carboxylic acid and metal oxide then liberates further water thereby accelerating the reaction. Accordingly, adding the dehydrating agent iii) to either of ingredient i) or ii), prior to the addition of the other of ingredient i) or ii) removes trace water from the system prior to any reaction of carboxylic acid and metal oxide compound.

It will be appreciated by one skilled in the art that the dehydrating agent iii) may be added to a solvent or other components of the coating composition prior to the addition of the carboxylic acid i) or the at least one metal oxide compound ii), following which either of component i) or ii) may be added, prior to the addition of the other of component i) or ii).

Preferably, the dehydrating agent is contacted and mixed with either of component i) or ii), prior to the addition of the other of component 1) or ii).

In one embodiment, the dehydrating agent is contacted with either of component i) or ii) and then, after an elapsed time period, T, the other of component i) or ii) is added. Preferably, the time period, T, is at least 5 seconds, more preferably at least 30 seconds and yet more preferably at least 1 minute.

Preferably, the dehydrating agent is contacted with either of component i) or ii) such conditions of time, temperature, pressure and, optionally, mixing, that the dehydrating agent is sufficiently homogeneously divided through the mixture of dehydrating agent and component i) or ii) to substantially remove any water therefrom, prior to the addition of the other of component i) or ii).

Preferably, the dehydrating agent is contacted with either of component i) or ii) in such conditions of time, temperature, pressure and, optionally, mixing, that the dehydrating agent is sufficiently homogeneously divided through the mixture of dehydrating agent and component i) or ii) to substantially prevent the formation of metal resinate, when the other of component i) or ii) is added.

The carboxylic acid comprises one or more of rosin or a hydrogenated derivative thereof.

The term "rosin" as used herein refers to the product of a harvesting of the gum exudations from surface cuts made in certain species of trees. Rosin is sometimes defined restrictively as the product obtained from pines. However, similar products comprised in the generic term "rosin" as used herein include Congo copal, Kauri copal, Darner and Manilla gums. Other processes for obtaining "rosin" as used herein include dissolving wood rosin from pine stumps after forests have been felled, or refining a by-product of the kraft paper manufacturing process to produce tall oil rosin.

Rosin typically comprises a mixture of resin acids, chiefly abietic add, being a polycyclic mono carboxylic acid. Accordingly, "rosin" as used herein also refers to such mixtures. Rosin as used herein also refers to synthetically produced rosin or resin acids and to pure or substantially pure resin acids, such as abietic acid.

The hydrogenated derivatives of rosin include partially or fully hydrogenated rosin. For example, the principle component in rosin is abietic acid, which contains two sites of ethylenic unsaturation. Hence, partially hydrogenated rosin may refer to rosin in which one of the sites of ethylenic unsaturation in abietic acid has been hydrogenated, whereas fully hydrogenated rosin may refer to rosin in which both of the sites of ethylenic unsaturation in abietic acid have been hydrogenated.

Preferably, the carboxylic acid is present in the coating composition in an amount of between about 5 and 50 wt %, more preferably between about 5 and 40 wt %, more preferably between about 10 and 30 wt % and yet more preferably between about 12 and 25 wt %.

The metal oxide compound is preferably selected from one or more of the following: copper (I) oxide; copper (II) oxide; zinc oxide; iron (II) oxide; iron (III) oxide; CaO; MgO; $TiO_2$; $MnO_2$.

Especially preferred metal oxide compounds are selected from one or more of copper (I) oxide, zinc oxide and iron (III) oxide.

Preferably, the at least one metal oxide compound is present in the coating composition in an amount of up to about 90 wt %, more preferably up to about 80 wt % and most preferably up to about 70 wt %.

Preferably, the at least one metal oxide compound is present in the coating composition in an amount of at least about 10 wt %, more preferably at least about 20 wt %, and yet more preferably at least about 30 wt %.

Preferably, the at least one metal oxide compound is present in the coating composition in an amount of between about 20 and 70 wt %, more preferably between about 30 and 65 wt % and yet more preferably between about 40 and 60 wt %.

Preferably, the dehydrating agent is any agent capable of removing water from the composition. Preferably, the dehydrating agent is inorganic. Preferred dehydrating agents include one or more of the following: sylosiv; sylosiv A4; anhydrous gypsum ($CaSO_4$); synthetic zeolite adsorbents (trade name: Molecular Sieve, etc.); orthoesters such as methyl orthoformate and methyl orthoacetate; orthoboric esters; silicates and isocyanates (trade name: Additive T1). In particular, anhydrous gypsum and Molecular Sieve are preferred as dehydrating agent. Dehydrating agents can be used individually or in any combination.

Preferably, the dehydrating agent is present in the coating composition in an amount of between about 0.1 and 10 wt %, more preferably in an amount of between about 0.5 and 8 wt % and yet more preferably in an amount of between about 1 and 5 wt %.

Preferably, the binder is any film forming binder. The binder may comprise an oligomeric or polymeric binder.

Preferably, the binder comprises an oligomeric or polymeric material. The binder may comprise an acrylate material, such as a polyacrylate material. The binder may comprise a silyl acrylate material, such as a poly silyl acrylate material.

The oligomeric or polymeric material may be formed from one or more monomer. In other words, the oligomeric or polymeric material may be a homopolymer/homooligomer or a copolymer/cooligomer (terpolymer/teroligomer etc).

The binder may comprise one or more oligomeric or polymeric material.

Preferably, the oligomeric or polymeric material is formed from one or more of the following monomers: alkyl acrylate; alkyl (alk)acrylate; $R^1{}_3$silyl acrylate, where each $R^1$ group is independently selected from any alkyl, alkenyl, alkynyl, aralkyl or aryl group $R^2{}_3$silyl (alk)acrylate where each $R^2$ group is independently selected from any alkyl, alkenyl, alkynyl, aralkyl or aryl group; a monomer having the general formula II:

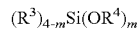

$$(R^3)_{4-m}Si(OR^4)_m \qquad \text{II}$$

where each $R^3$ is independently selected from any alkyl, alkenyl, alkynyl, aralkyl or aryl group, and where each $R^4$ is independently selected from hydrogen or any alkyl, alkenyl, alkynyl, aralkyl, aryl, and m=1 to 4.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like.

The term "alkenyl", as used herein, relates to hydrocarbon radicals having one or several, preferably up to 4, double bonds, being straight, branched, cyclic or polycyclic moieties or combinations thereof and containing from 2 to 18 carbon atoms, preferably 2 to 10 carbon atoms, more preferably from 2 to 8 carbon atoms, still more preferably 2 to 6 carbon atoms, yet more preferably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like.

The term "alkenyl", as used herein, relates to hydrocarbon radicals having one or several, preferably up to 4, triple bonds, being straight, branched, cyclic or polycyclic moieties or combinations thereof and having from 2 to 18 carbon atoms, preferably 2 to 10 carbon atoms, more preferably from 2 to 8 carbon atoms, still more preferably from 2 to 6 carbon atoms, yet more preferably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsiloxane groups. Examples of such radicals may be independently selected from alkynyl radicals include ethynyl, propynyl, propargyl, butynyl, pentynyl, hexynyl and the like.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsilicon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-ecetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphtyl, indanyl, biphenyl, phenanthryl, anthryl or acenaphthyl and the like.

The term "aralkyl" as used herein, relates to a group of the formula alkyl-aryl, in which alkyl and aryl have the same meaning as defined above and may be attached to an adjacent radical via the alkyl or aryl part thereof. Examples of such radicals may be independently selected from benzyl, phenethyl, dibenzylmethyl, methylphenylmethyl, 3-(2-naphthyl)-butyl, and the like The term "Het", when used herein, includes four-to-twelve-membered, preferably four-to-ten-membered ring systems, which rings contain one or more heteroatoms selected from nitrogen, oxygen, sulphur and mixtures thereof, and which rings may contain one or more double bonds or be non-aromatic, partly aromatic or wholly aromatic in character. The ring systems may be monocyclic, bicyclic or fused. Each "Het" group identified herein is optionally substituted by one or more substituents selected from halo, cyano, nitro, oxo, lower alkyl (which alkyl group may itself be optionally substituted or terminated as defined below) $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$ or $C(S)NR^{25}R^{26}$ wherein $R^{19}$ to $R^{27}$ each independently represent hydrogen, aryl or lower alkyl (which alkyl group itself may be optionally substituted or terminated as defined below). The term "Het" thus includes groups such as optionally substituted azetidinyl, pyrrolidinyl, imidazolyl, indolyl, furanyl, oxazolyl, isoxazolyl, oxadiazolyl, thiazolyl, thiadiazolyl, triazolyl, oxatriazolyl, thiatriazolyl, pyridazinyl, morpholinyl, pyrimidinyl, pyrazinyl, quinolinyl, isoquinolinyl, piperidinyl, pyrazolyl and piperazinyl. Substitution at Hat may be at a carbon atom of the Het ring or, where appropriate, at one or more of the heteroatoms.

"Het" groups may also be in the form of an N oxide.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The oligomeric or polymeric material may be formed from one or more of the following monomers: $C_1$-$C_{10}$akyl ($C_0$-$C_{10}$alk)acrylate; trialkyl or trialkoxy silyl ($C_0$-$C_{10}$alk)acrylate.

Particularly preferred monomers are alkyl acrylates and alkyl (alk)acrylates such as: methyl acrylate, ethyl acrylate, propyl acrylate, butyl acrylate, methyl(meth)acrylate, ethyl (meth)acrylate, propyl(meth)acrylate and butyl(meth)acrylate.

The oligomeric or polymeric material may also include vinyl chloride, vinyl ether, vinyl isobutyl ether, vinyl acetate, vinyl alcohol.

The binder may comprise zinc acrylate. The binder may comprise copper acrylate.

Preferably the binder is an inert binder. By the term inert binder it is meant a binder that is not chemically reactive toward common self polishing antifouling coating ingredients such as zinc oxide, cuprous oxide, iron oxide, rosin (with reactive carboxylic acid group and double bonds), thixotropic agents, etc. under the conditions in which the coating is prepared, administered or used.

Preferably, the binder is also inert with regard to seawater, thus no excessive swelling and/or water uptake and no hydrolysis of the coating occurs upon extended exposure to seawater.

is also possible for rosin to act as a binder. Accordingly, where the carboxylic acid (i) is selected as rosin, the rosin may also be the one or more binder (iv).

The coating composition may comprise only one binder. However, in one embodiment, the coating composition may comprise two or more binders.

Preferably, the binder is present in the coating composition in an amount of between about 0.1 and 20 wt %, more preferably, between about 0.5 and 10 wt %, more preferably between about 1 and 5 wt %

The coating composition may contain other components such as solvents, pigments, thixotropic agents, biocides etc.

The solvent may be an organic solvent, such as xylene, toluene, ketones (acetone, MIBK, MAK etc), high boiling aromatic solvents, ethyl acetate and butyl acetate, for example.

Pigments may be selected from one or more of iron (III) oxide, titanium dioxide, zinc oxide etc. It will be appreciated by one skilled in the art that many pigments are metal oxide compounds. In such a scenario, in the context of the present invention, it should be appreciated that the pigment should be treated as a metal oxide compound and should therefore be added to the dehydrating agent of the composition prior to adding the carboxylic acid, or added to the composition after the dehydrating agent is added to the carboxylic acid.

In one embodiment, the coating composition may also comprise a metal resinate, such as zinc resinate, copper resinate, calcium resinate or magnesium resinate.

The metal resinate r may be present in the coating composition in an amount of between about 0.1 to 10% by weight, preferably between about 1 and 8% by weight and most preferably between about 3 and 6% by weight.

Although the benefit of the present invention is that the formation of metal resinate in the coating is prevented, as discussed above, metal resinate may be separately added to the coating compositions. It will be appreciated that proceeding in this manner allows the coating composition to retain the benefit in terms of the increased sell polishing rates, while controlling the amount of metal resinate (rather than allowing uncontrollable reactions to occur in situ).

The present inventors have also found that the use of an oligomer or polymer formed with a high percentage of a vinyl ester of versatic acid monomer units is a particularly advantageous binder in an antifouling self polishing coating composition.

Therefore, in one embodiment, the binder (iv) may comprise an oligomer or polymer composition, formed from at least 50% by weight of monomer units of a vinyl ester of versatic acid.

Preferably, the coating composition is an antifouling coating composition. Alternatively or additionally, the coating composition may be a self polishing coating composition.

By the term, "versatic acid" it is meant an acid or mixture of acids corresponding to the general formula $CR^5R^6CH_3CO_2H$ in which there is a total of 9 to 11 carbon atoms and each of $R^5$ and $R^6$ is an alkyl group. A general formula of versatic acid is shown in formula (i) below:

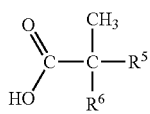

Formula (i)

Accordingly, the general formula of a vinyl ester of versatic acid is shown in formula (ii) below:

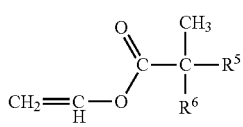

Formula (ii)

Wherein $R^5$ and $R^6$ each independently represents a $C_1$ to $C_7$ branched or unbranched alkyl group, but wherein the total number of carbon atoms in the vinyl ester of versatic acid of formula (ii) is between 11 and 13.

Accordingly, $R^5$ and $R^6$ may each independently be selected from a methyl group; an ethyl group, a linear or branched propyl group, a linear or branched butyl group; a linear, branched or cyclic pentyl group; a linear, branched or cyclic hexyl group; or a linear, branched or cyclic heptyl group.

For example, if $R^5$ is selected as a propyl group, then $R^6$ may be selected as any of a linear, branched or cyclic propyl, butyl or pentyl group, thereby making a vinyl ester of versatic acid having 11, 12 or 13 carbon atoms respectively.

It is especially preferred that the number of carbon atoms in the vinyl ester of versatic acid is 11, thus being a vinyl ester of a versatic acid having 9 carbon atoms.

Such vinyl esters of versatic acid are commercially available under the name "Veova" ® from Hexion Speciality Chemicals.

The balance of the monomers required to make the polymer may be selected from one or more of any known co-monomer, preferably co-monomers having a single ethylenically unsaturated group therein.

Suitable co-monomers include the alkyl esters of acrylic acid and the alkyl esters of (alkyl)acrylic acids. For example, preferred co-monomers include $C_{1-4}$alkyl($C_{0-4}$alk)acrylates, such as: methyl acrylate, ethyl acrylate, propyl acrylate, butyl acrylate, methyl(meth)acrylate, ethyl(meth)acrylate, propyl (meth)acrylate, butyl(meth)acrylate, methyl(eth)acrylate, ethyl(eth)acrylate, propyl(eth)acrylate, butyl(eth)acrylate, methyl(prop)acrylate, ethyl(prop)acrylate, propyl(prop) acrylate, butyl(prop)acrylate, methyl(but)acrylate, ethyl(but) acrylate, propyl(but)acrylate, butyl(but)acrylate.

Particularly preferred co-monomers include methyl acrylate, ethyl acrylate, propyl acrylate, butyl acrylate and methyl (meth)acrylate.

It will be appreciated that the co-monomers used with the vinyl ester of versatic acid may be any of the monomers mentioned above in relation to the first aspect, in particular, the co-monomers used with the vinyl ester of versatic acid may be one or more of the following monomers: alkyl acrylate; alkyl (alk)acrylate; $R^1_3$silyl acrylate, where each $R^1$ group is independently selected from hydrogen or any alkyl, alkenyl, alkynyl, aralkyl or aryl group; $R^2_3$silyl (alk)acrylate where each $R^2$ group is independently selected from hydrogen or any alkyl, alkenyl, alkynyl, aralkyl or aryl group; a monomer having the general formula II:

$$(R^3)_{4-m}Si(OR^4)_m \qquad \qquad II$$

where each $R^3$ is independently selected from hydrogen or any alkyl, alkenyl, alkynyl, aralkyl or aryl group, and where each $R^4$ is independently selected from hydrogen or any alkyl, alkenyl, alkynyl, aralkyl, aryl, and m=1 to 4.

Preferably, the polymer composition comprises at least about 60% by weight of monomer units of a vinyl ester of versatic acid, more preferably at least about 70% by weight, yet more preferably at least 80% by weight, and yet more preferably at least about 80% by weight.

In a particularly preferred embodiment, the polymer composition comprises at least about 90% by weight of monomer units of a vinyl ester of versatic acid and preferably at least about 95% by weight.

Most preferably, the polymer composition is substantially a homopolymer of monomer units of a vinyl ester of versatic acid. For example, the polymer composition may comprise at least about 98% by weight or preferably at least about 99% by weight of monomer units of a vinyl ester of versatic acid.

In one embodiment, the polymer composition is formed exclusively from monomer units of a vinyl ester of versatic acid.

Preferably, the binder as described above in relation the present embodiment may be in the coating composition of the first aspect, either as the only binder content or in combination with the other binders as mentioned above.

In a further embodiment, the binder (iv) comprises an oligomer or polymer composition, formed from at least 50% by weight of monomer units of a vinyl ester of versatic acid.

Preferably, the polymer composition comprises at least about 60% by weight of monomer units of a vinyl ester of versatic acid, more preferably at least about 70% by weight, yet more preferably at least 80% by weight, and yet more preferably at least about 80% by weight.

In a particularly preferred embodiment, the polymer composition comprises at least about 90% by weight of monomer units of a vinyl ester of versatic acid and preferably at least about 95% by weight.

Most preferably, the polymer composition is substantially a homopolymer of monomer units of a vinyl ester of versatic acid. For example, the polymer composition may comprise at least about 98% by weight or preferably at least about 99% by weight of monomer units of a vinyl ester of versatic acid.

In a further preferred embodiment, the binder (iv) is formed by polymerizing a monomer mixture comprising at least 50% by weight of monomer units of a vinyl ester of versatic acid. Preferably, the monomer mixture further comprises one or more initiator. The initiator may be a peroxide compound, such as di-t-amyl peroxide, for example.

Preferably, the coating composition is a marine coating composition, preferably an antifouling coating composition, preferably a self polishing coating composition.

According to a second aspect of the invention there is provided a coating composition comprising a carboxylic acid, the carboxylic acid comprising one or more of rosin or a hydrogenated derivative thereof; and at least one metal oxide compound, which coating composition contains less than 3% by weight of metal carboxylate.

Preferably, the coating composition comprises less than 2.5% metal carboxylate by weight, more preferably, less than about 2% by weight, yet more preferably less than about 1.5% by weight. In a particularly preferred embodiment, the coating composition comprises less than 1% metal carboxylate by weight, more preferably, less than about 0.5% by weight.

Preferably, the coating composition comprises substantially no metal carboxylate.

The carboxylic acid comprises rosin or a hydrogenated derivative thereof and therefore, the metal carboxylate is preferably a metal resinate.

The present invention also extends to a marine vessel or marine structure coated with a coating composition according to the first or second aspect of the present invention.

According to a yet further aspect of the present invention there is provided a method of forming a coating composition, the coating composition comprising:
  i) a carboxylic acid comprising one or more of rosin or a hydrogenated derivative thereof;
  ii) at least one metal oxide compound;
  iii) a dehydrating agent; and
  iv) one or more binder;

the method comprising contacting the dehydrating agent iii) with either of component i) or ii), prior to the addition of the other of component i) or ii).

All of the features contained herein may be combined with any of the above aspects and in any combination.

For a better understanding of the invention, and to show how embodiments of the same may be carried into effect, reference will now be made, by way of example, to the accompanying diagrammatic drawings and examples in which:

FIGS. 1 to 4 show FTIR spectra relating to the examples as discussed hereunder.

The invention will be further discussed with reference to the following non limiting examples.

In the examples, the following test methods were employed:

Test Methods

Can Stability: The paint is stored in a dosed can at 40° C. and the viscosity determined at regular intervals; here after 18 weeks.

Determination of the Viscosity: The viscosity was measured using a Haake VT 181 (body E30 or 100) viscosimeter under standard conditions [ASTM test method D2196-86].

Evaluation of the Polishing of Paints: The erosion rate is the average decrease in film thickness (expressed in μm/month) per month over the whole test.

Stainless steels discs, 20 cm in diameter, were protected with a standard anti-corrosive system (300 μm in dry film thickness). Two layers of the self-polishing paint to be tested were applied, to give a total dry film thickness between 200 and 300 μm. The tests were carried out in constantly refreshed natural seawater, at a constant temperature of 20° C. The discs were rotated at 1000 rpm, corresponding to about 34 km/h (18 knots) at 9 cm from the center.

The total dry film thickness was determined at 2 monthly intervals, after allowing the paint to dry during one day. It was measured at a number of fixed points, each located at 4.5 and 6.6 and 9 cm from the center of the discs.

The evaluation of the antifouling activity of the paints: The antifouling activity was tested by applying the prepared paints to a panel over anti-corrosive paint, mounting the panel on a frame and immersing the frame from a raft in a seawater estuary off the Southern Netherlands during the active season (March to October). Each test also included panels coated with a non-toxic control (which became heavily fouled with seaweed and some animal life within 4 weeks). The fouling rate is reported by stating the area covered with fouling.

EXAMPLES

Example Formulation 1

| | |
|---|---|
| Xylene | 14.18 |
| Sylosiv A4 | 2.89 |
| Foral AX-E | 18.46 |
| Neocryl B725 | 2.00 |
| Disparlon 6650 | 0.90 |
| Bayferrox 130 BM | 7.23 |

-continued

| | |
|---|---|
| Zineb Nautec | 8.81 |
| Cuprous oxide | 45.53 |
| Total | 100 |

Example Formulation 2

| | |
|---|---|
| Xylene | 13.04 |
| Sylosiv A4 | 2.90 |
| Foral AX-E | 18.56 |
| Veova 9 homopolymer solution | 2.68 |
| Disparlon 6650 | 0.91 |
| Bayferrox 130 BM | 7.27 |
| Zineb Nautec | 8.86 |
| Cuprous oxide | 45.78 |
| Total | 100.00 |

Sylosiv A4 (RTM) is a zeolite dehydrating agent (water scavenger) commercially available from Grace
Foral AX-E (RTM) is a fully hydrogenated rosin, commercially available from Eastman
Neocryl B725 (RTM) is a BMA/MMA copolymer commercially available from DSM
Disparlon 6650 (RTM) is a polyamide wax thixotropic agent, commercially available from Kusumoto
Bayferrox 130 BM (RTM) is an iron oxide pigment, commercially available from Lanxess
Zineb Nautec (RTM) is a biocide, commercially available from United Phosphorus
Veova 9 (RTM) commercially available from Hexion Speciality Chemicals The Veova 9 homopolymer solution used herein was prepared as follows:

| | |
|---|---|
| Xylene | 18.505 Kg |
| Veova 9 | 74.019 Kg |
| Luperox DTA | 0.814 Kg |
| Xylene | 6.662 Kg |

Luperox DTA is a peroxide initiator, being Di-t-amyl peroxide solution commercially available from Arkema Step 1

Under nitrogen and constant agitation speed, reactor with xylene charge is heated at 135° C.

Step 2

At 135° C., monomer mixture and initiator are added in the reactor at a constant rate during 3 hours. When the addition is complete, keep the reactor at 135° C. for 60 minutes.

Step 3

Add 0.15 g of Luperox DTA and repeat addition three times after 60 minutes.

Step 4

Cooling at 10° C. and dilution with xylene.

Step 5

Adjust viscosity with xylene.

After preparation, a solution with a solids content of 74.6% and a viscosity (Haake, 23° C.) of 49.4 dPa·s is obtained. The Mw of the solution (measured by GPC, with polystyrene standards) is 7900, with a polydispersity of 2.3

The ingredients of example formulations 1 and 2 were then mixed according to preparation methods 1 and 2 (comparative). Details of preparation method 1 and 2 are detailed hereunder. Example formulations 1 and 2 were also prepared without the addition of any dehydrating agent (comparative II). This method is denoted preparation method 3.

Preparation Method 1

| Method 1 | Alternative method (1A) |
|---|---|
| Addition 1 | Addition 1 |
| rosin solution | Xylene (solvent) |
| co-binder solution | Drying agent |
| drying agent | Cuprous oxide (and/or other metal oxide) |
| Thix/anti-sagging agent | |
| Disperse until homogenously divided | Disperse until homogenously divided |
| Addition 2 | Addition 2 |
| Colouring pigment (optional) | rosin solution or solid rosin |
| Fillers (Non-reactive with rosin; optional) | co-binder solution |
| Algicide (optional) | Disperse & dissolve until homogenously divided |
| Addition 3 | Addition 3 |
| Cuprous oxide (and/or other metal oxide) | Thix/anti-sagging agent |
| Disperse | Disperse until homogenously divided |
| | Addition 4 |
| | Colouring pigment (optional) |
| | Fillers (Non-reactive with rosin; optional) |
| | Algicide (optional) |

Method 1 and Method 1A above are both methods according to the invention. In method 1, the rosin and drying agent are mixed prior to addition of the metal oxide. In Method 1A, the metal oxide and drying agent are mixed prior to addition of the rosin.

It will be appreciated, as discussed above, that the drying agent can be first mixed with a solvent, prior to adding any components.

Preparation Method 2 (Comparative)

| Addition 1 |
| --- |
| solvent(s) |
| Rosin or hydrogenated derivative |
| solid co-binder or solution thereof |
| Disperse until dissolved |
| Addition 2 |
| Thix/anti-sagging agent |
| Disperse |
| Addition 3 |
| Colouring pigment (optional) |
| Fillers (Non-reactive with rosin; optional) |
| Algicide (optional) |
| cuprous oxide |
| drying agent |
| Disperse |

Preparation Method 3 (Comparative II)

Preparation method 3 is the same as preparation method 1 or 1A, but without the addition of a drying agent.

Accordingly, the following coating compositions were prepared from example formulations 1 and 2:

|  | Example formulation 1 | Example formulation 2 |
| --- | --- | --- |
| Preparation method 1 | Coating 1 | Coating 2 |
| Preparation method 2 | Coating 1 (comparative) | Coating 2 (comparative) |
| Preparation method 3 | Coating 1 (comparative II) | Coating 2 (comparative II) |

Results

The coatings were each subjected to infrared spectroscopy, as shown in the attached figures. FIG. 1 shows the FTIR spectra of coating 1, coating 1 (comparative) and coating 1 (comparative II). As can be seen in FIG. 1, the peak at 1730 $cm^{-1}$ represents an ester band from the BMA/MMA copolymer, the peak at 1695 $cm^{-1}$ represents an acid band from the free rosin, while the peak at 1600 $cm^{-1}$ represents a salt band from the copper resinate. Coating 1 shows a very weak peak at 1600 $cm^{-1}$, while the comparative spectra show much stronger peaks, indicating a larger presence of the metal resinate.

Figure 2:
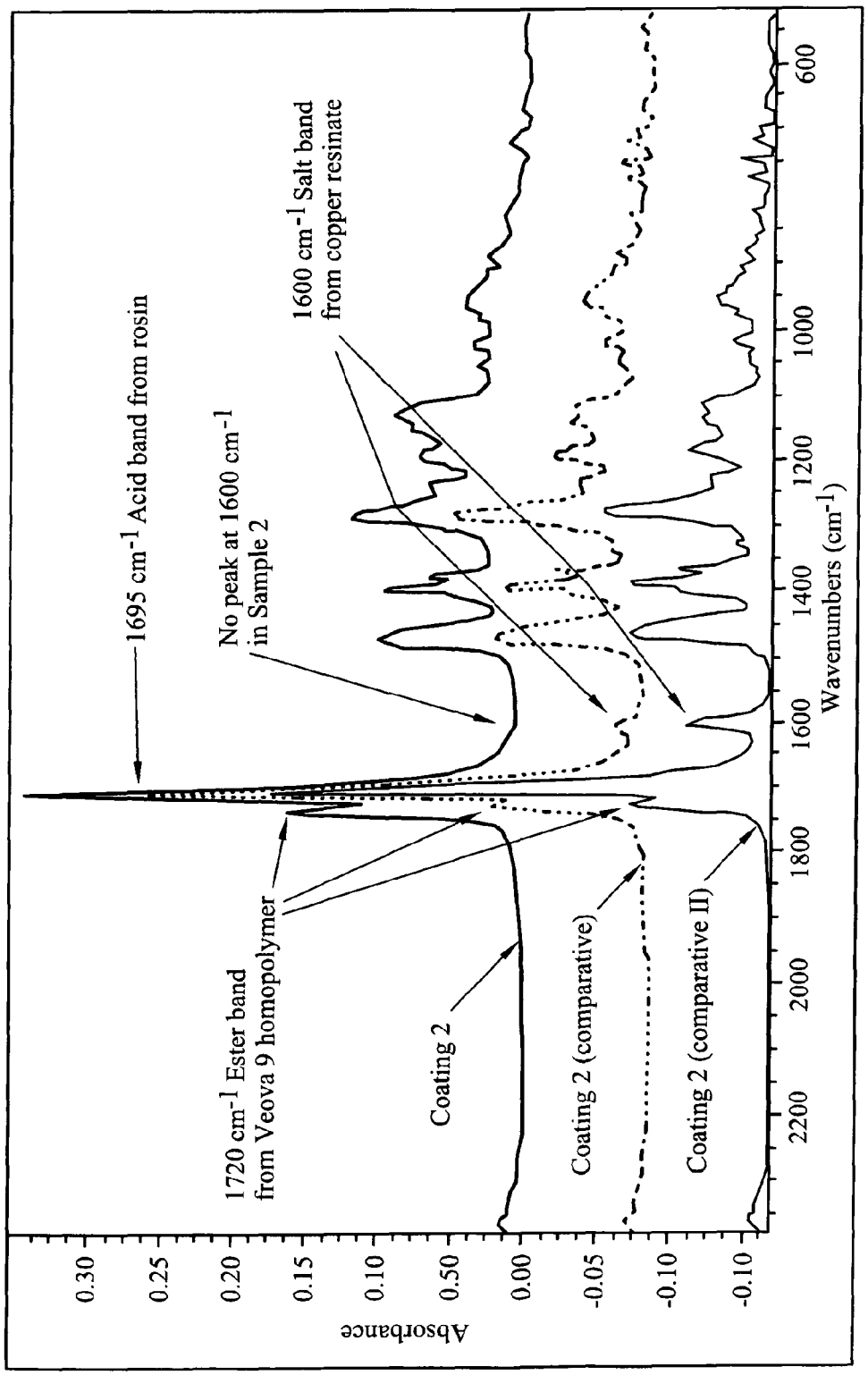

Turning to FIG. 2, this shows the FTIR spectra of coating 2, coating 2 (comparative) and coating 2 (comparative II). As can be seen in FIG. 2, the peak at 1720 $cm^{-1}$ represents an ester band from the Veova® homopolymer, peak at 1695 $cm^{-1}$ represents an acid band from the free rosin, while peak the at 1600 $cm^{-1}$ represents a salt band from the copper resinate. Coating 2 shows no peak at all at 1600 $cm^{-1}$ (as indicated by an arrow indicating a complete absence of detectable metal resinate formation in coating 2.

The coatings were also tested for polishing rates and fouling rates. The results are given in the following table.

|  | Can stability at 40° C. Viscosity in dPa · s at 23° C. [% Copper resinate by IR] | | Polishing rate Over 18 months At 9-13-18 knots | Fouling rate After 12 months static on raft |
| --- | --- | --- | --- | --- |
|  | T = 0 | T = 18 weeks | [μm/month] |  |
| Coating 1 | 19 [0.5] | 23 [1.4] | 12; 13; 16 | 80% Slime No Algae No hard fouling |
| Coating 1 (comparative) | 29 [0.8] | 34 [2.1] | 10; 11; 13 | 90% slime No Algae No hard fouling |
| Coating (comparative II) | 21 [4.5] | 33 [8.1] | 3; 4; 5 | 100% Slime + 25% area covered with algae |
| Coating 2 | 20 [0.0] | 26 [0.5] | 7; 8; 10 | 75% area slime No Algae No hard fouling |
| Coating 2 (comparative) | 21 [0.8] | 28 [2.5] | 5; 6; 8 | 90% slime No Algae No hard fouling |
| Coating 2 (comparative II) | 21 [3.3] | 33 [7.4] | 2; 3; 4 | Slime + 33% area covered with algae |

Note:
Maximum content of copper resinate is circa 19%

Examples Formulations 3 to 9

Further example formulations were prepared, each according to preparation method 1 discussed above, and with the following components.

Example Formulation 3

| | |
|---|---|
| Xylene | 11.54 |
| Sylosiv A4 | 2.88 |
| Foral AX-E | 17.02 |
| Neocryl B725 | 1.80 |
| Polyace NSP-100 | 4.50 |
| Disparlon 6650 | 0.88 |
| Bayferrox 130 BM | 7.21 |
| Zineb Nautec | 8.78 |
| Cuprous oxide | 45.39 |
| Total | 100 |

Polyace NSP-100 is a silylacrylate binder, having a solid content of 50% and being commercially available from Nitto Kasei.

Example formulation 3 is similar to that of example formulation 1, but includes a silylacrylate co-binder.

Example Formulation 4

| | |
|---|---|
| Xylene | 10.72 |
| Sylosiv A4 | 2.89 |
| Foral AX-E | 17.12 |
| Veova 9 homopolymer solution | 2.14 |
| Polyace NSP-100 | 4.52 |
| Disparlon 6650 | 0.89 |
| Bayferrox 130 BM | 7.24 |
| Zineb Nautec | 8.83 |
| Cuprous oxide | 45.64 |
| Total | 100.00 |

Example formulation 4 is similar to that of example formulation 2, but includes a silylacrylate co-binder.

Example Formulation 5

| | |
|---|---|
| Xylene | 8.2 |
| Sylosiv A4 | 1.2 |
| Gum rosin | 5.6 |
| Plasticizer $ | 2.0 |
| Polyace NSP-100 | 21.0 |
| Disparlon 6650 | 1.0 |
| Bayferrox 130 BM | 5.0 |
| Sea-nine 211* | 6.0 |
| Cuprous oxide | 50.00 |
| Total | 100.0 |

*As plasticizer, dialkylphthalates (commercially available as Palatinols from BASF); alternatively chlorinated paraffine (e.g. Cerechlors from Ineos Chlor)
**Sea-nine 211 is a DCOIT solution in xylene, commercially available from Dow Chemicals Example Formulation 6

| | |
|---|---|
| Xylene | 12.16 |
| Sylosiv A4 | 2.88 |
| Foral AX-E | 16.56 |
| Neocryl B725 | 1.80 |
| Zinc acrylate (50% solids) $ | 4.33 |
| Disparlon 6650 | 0.90 |
| Bayferrox 130 BM | 7.20 |
| Zineb Nautec | 8.78 |
| Cuprous oxide | 45.39 |
| Total | 100 |

$ zinc acrylate was prepared according example A1 of EP 1006 156

Example formulation 6 is similar to example 1, but includes a zinc acrylate co-binder.

Example Formulation 7

| | |
|---|---|
| Xylene | 11.08 |
| Sylosiv A4 | 2.89 |
| Foral AX-E | 16.64 |
| Veova 9 homopolymer solution | 2.47 |
| Zinc acrylate (45% solids) $$ | 4.35 |
| Disparlon 6650 | 0.90 |
| Bayferrox 130 BM | 7.24 |
| Zineb Nautec | 8.82 |
| Cuprous oxide | 45.60 |
| Total | 100.00 |

$$ zinc acrylate was prepared according example C1 of patent U.S. 5,631,308

Example formulation 7 is similar to example formulation 2, except that zinc acrylate co-binder was used.

Example Formulation 8

| | |
|---|---|
| Xylene | 12.16 |
| Sylosiv A4 | 2.88 |
| Foral AX-E | 16.56 |
| Neocryl B725 | 1.80 |
| Bremazit 3050 (50% in xylene)# | 4.33 |
| Disparlon 6650 | 0.90 |
| Bayferrox 130 BM | 7.20 |
| Zineb Nautec | 8.78 |
| Cuprous oxide | 45.39 |
| Total | 100 |

Bremazit 3050 is a solid zinc resinate commercially available from Robert Kraemer GmbH.

Example formulation 8 is similar to example formulation 1, except that zinc resinate is added to the formulation.

Example Formulation 9

| | |
|---|---|
| Xylene | 11.08 |
| Sylosiv A4 | 2.89 |
| Foral AX-E | 16.64 |
| Veova 9 homopolymer solution | 2.47 |
| Bremazit 3050 (50% in xylene)# | 4.35 |
| Disparlon 6650 | 0.90 |

| | |
|---|---:|
| Bayferrox 130 BM | 7.24 |
| Zineb Nautec | 8.82 |
| Cuprous oxide | 45.60 |
| Total | 100.00 |

Example formulation 9 is similar to example formulation 2, except that zinc resinate is added to the formulation.

It should be noted that, in example formulations 8 and 9, the amount of free rosin and zinc resinate can be closely controlled by adding specific amounts of the two ingredients, rather than by simply adding free rosin to zinc oxide to the formulation and allowing the two ingredients to react in situ.

Example Formulations 10, 11 and 12

Example formulations 10, 11 and 12 were prepared using zinc oxide as the metal oxide. No other metal oxides, no zineb and no other inert co-binder was used in these formulations in order to have very clear IR spectra for evidence. Examples 10 and 11 we carried out according to Method 3 described above (ie. without the addition of any dehydrating agent), whereas Example 12 was carried out according to Method 1. The details of these examples are as follows:

Example Formulation 10

| | |
|---|---:|
| Xylene | 25 |
| Natural gumrosin | 25 |
| Stirr until dissolved | |
| Bentone SD2 | 1 |
| Disperse at high speed | |
| Add and disperse | |
| Zinc oxide (indirect) | 50 |
| Total | 100.00 |

Bentone SD2 is an anti-settling agent commercially available from Elementis
Zinc oxide is commercially available from Umicore in a "direct" and an "indirect" quality.

Example Formulation 11

| | |
|---|---:|
| Xylene | 24 |
| Natural gumrosin | 25 |
| Stirr until dissolved | |
| Then add | |
| Bentone SD2 | 1 |
| Disperse at high speed | |
| Add and disperse | |
| Zinc oxide (direct) | 50 |
| Total | 100.00 |

Example Formulation 12

| | |
|---|---:|
| Xylene | 24 |
| Natural gumrosin | 25 |
| Stirr until dissolved | |
| Then add | |
| Sylosiv A4 | 5 |
| Bentone SD2 | 1 |
| Disperse at high speed | |
| Add and disperse | |
| Zinc oxide (direct) | 45 |
| Total | 100.00 |

Figure 3:
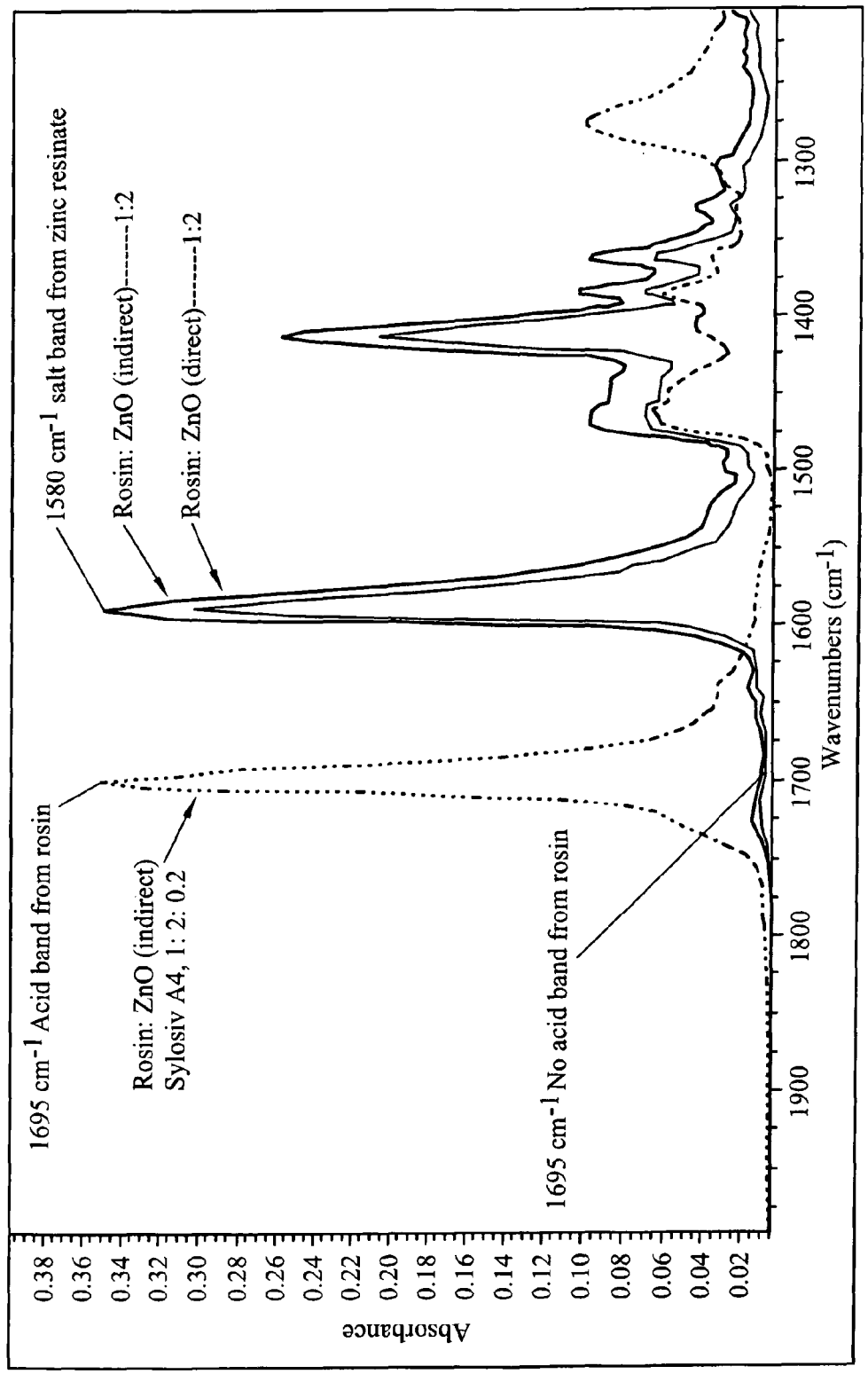

FIG. 3 shows overlayed infrared spectra from the clear binder fraction obtained by centrifugation of the coating formed according to examples 10, 11 and 12. As can be seen in FIG. 3, the IR spectra for examples 10 and 11 show strong metal resinate peaks at 1580 cm$^{-1}$, but no acid band from free rosin at 1695 cm$^{-1}$, whereas the spectrum for example 12 shows a strong peak at 1695 for the rosin acid, but no metal resinate peak at 1580 cm$^{-1}$. This displays that in the example according to the invention (example 12) little or no zinc resinate is formed and the rosin remains unreacted.

As can be seen from the above examples, a coating composition according to the present invention contains little or no metal resinate formation, which results in a coating composition that has surprisingly improved polishing rates and antifouling rates.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coating composition comprising:
   i) a carboxylic acid; comprising one or more of rosin or a hydrogenated derivative thereof;
   ii) at least one metal oxide compound;
   iii) a dehydrating agent; and
   iv) one or more binder;
   wherein, in the production of the coating composition, the dehydrating agent iii) is contacted with either of component i) or ii), prior to the addition of the other of component i) or ii), and wherein the composition contains less than 0.5% by weight of metal carboxylate; and wherein the coating composition contains less metal resinate, as determined by Fourier transform infrared spectroscopy (FTIR), than a coating composition produced by contacting the dehydrating agent iii) with either of i) and ii) after i) and ii) have been contacted; or by contacting i), ii), and iii) at the same time.

2. A coating composition according to claim 1, wherein the dehydrating agent is contacted and mixed with either of component i) or ii), prior to the addition of the other of component i) or ii).

3. A coating composition according to claim 1, wherein the carboxylic acid is present in the coating composition in an amount of between about 12 and 25 wt %.

4. A coating composition according to claim 1, wherein the at least one metal oxide compound is selected from one or more of copper (I) oxide, zinc oxide and iron (III) oxide.

5. A coating composition according to claim 1, wherein the at least one metal oxide compound is present in the coating composition in an amount of between about 40 and 60 wt %.

6. A coating composition according to claim 1, wherein the dehydrating agent is selected from one or more of anhydrous gypsum and/or a molecular sieve/zeolite.

7. A coating composition according to claim 1, wherein the dehydrating agent is present in the coating composition in an amount of between about 1 and 5 wt %.

8. A coating composition according to claim 1, wherein the binder comprises an oligomeric or polymeric material, the oligomeric or polymeric material being formed from one or more of the following monomers: $C_1$-$C_{10}$alkylacrylate; $C_1$-$C_{10}$alkyl-$C_0$-$C_{10}$alk-acrylate; trialkylsilylacrylate; trialkylsilyl-$C_0$-$C_{10}$alk-acrylate.

9. A coating composition according to claim 1, wherein the binder is present in the coating composition in an amount of between 1 and 5 wt %.

10. A coating composition according to claim 1, wherein the binder comprises an oligomer or polymer composition, formed from at least 50% by weight of monomer units of a vinyl ester of versatic acid.

11. A coating composition comprising i) a carboxylic acid, the carboxylic acid comprising one or more of rosin or a hydrogenated derivative thereof; and ii) at least one metal oxide compound, which coating composition contains less than 0.5% by weight of metal carboxylate; and wherein the coating composition contains less metal resinate, as determined by Fourier transform infrared spectroscopy (FTIR), than a coating composition produced by contacting a dehydrating agent iii) with either of i) and ii) after i) and ii) have been contacted; or by contacting i), ii), and iii) at the same time.

12. A method of forming a coating composition, the coating composition comprising:
   i) a carboxylic acid; comprising one or more of rosin or a hydrogenated derivative thereof;
   ii) at least one metal oxide compound;
   iii) a dehydrating agent; and
   iv) one or more binder;
the method comprising contacting the dehydrating agent iii) with either of component i) or ii), prior to the addition of the other of component i) or ii).

* * * * *